B. FRESE.
Rotary Engine.

No. 204,430. Patented June 4, 1878.

Witnesses:
Henry Lawrence.
Charles B. Brigham.

Inventor:
Bernard Frese.

UNITED STATES PATENT OFFICE.

BERNARD FRESE, OF CHICAGO, ILLINOIS, ASSIGNOR OF ONE-HALF HIS RIGHT TO HENRY LAWRENCE, OF SAME PLACE.

IMPROVEMENT IN ROTARY ENGINES.

Specification forming part of Letters Patent No. 204,430, dated June 4, 1878; application filed December 8, 1877.

*To all whom it may concern:*

Be it known that I, BERNARD FRESE, of Chicago, in the county of Cook and State of Illinois, have invented new and useful Improvements in Rotary Engines, which improvements are fully set forth in the following specification and accompanying drawings, in which—

Figure 1:
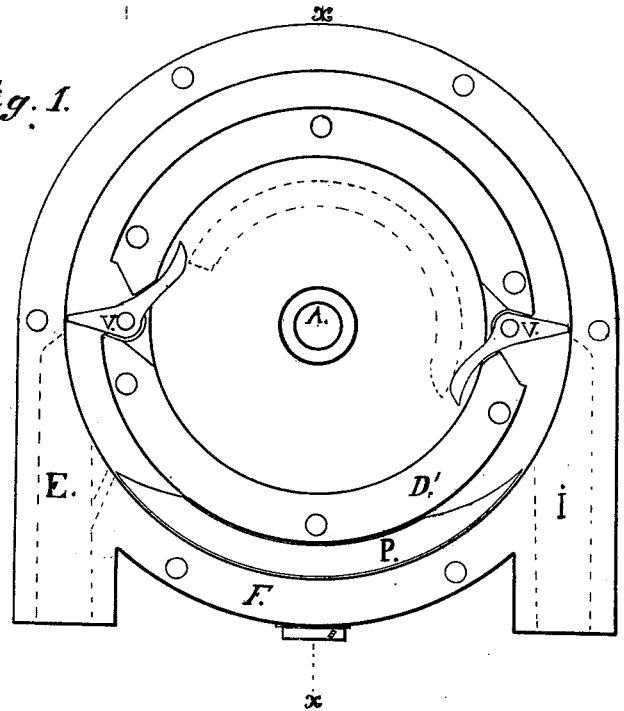
Figure 2:
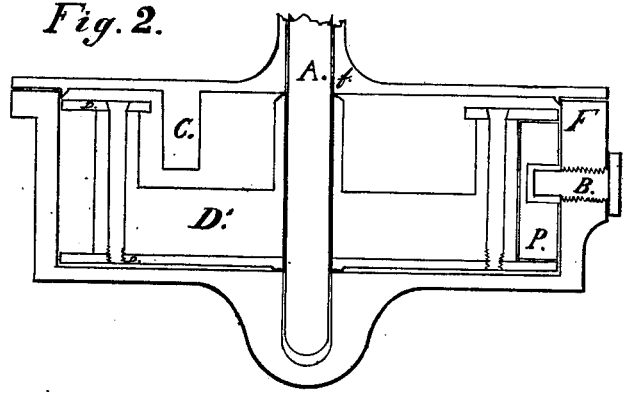
Figure 3:
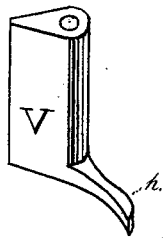

Figure 1 is a plan with the covering-plate of the casing and one revolving disk removed. Fig. 2 is a section on line $x$ of Fig. 1, with the disk and covering-plate replaced. Fig. 3 is a perspective view of the piston-wings.

The object of my invention is to simplify the construction of a rotary engine having continuous uniform impulse, and to avoid friction, which I accomplish by placing in a circular casing having two side openings three circular disks, of which the middle one is fastened on a shaft which has its bearings in the casing and covering-plate. The two outer disks are bolted to the middle one and fit in the casing. The middle disk is of less diameter, and thereby forms a vacant space between the two outer disks, the casing, and itself, and has recesses in it to receive valves which are pivoted on the outer disks; and by fitting a piston in a part of the space so formed, and fastening the same to the casing so that it will have lateral motion, a cam on the covering-plate keeps the valves in position by a horn on them.

In the drawings, A is the shaft to which the disk D' is fastened. D D are two disks, fastened onto D'. F is the casing, and $f$ the covering-plate for the same, with the cam C attached to it, the position of which is also indicated by dotted lines in Fig. 1. I and E are the side openings, (indicated by dotted lines.) P is the abutment, and B the bolt holding the same with the casing. O are the piston-wings, having horns $h$.

On admitting pressure at the opening I, the piston-wing V and abutment P are encountered, and the wing, being fastened to the revolving disks, which are free to move on an axis, is forced around in the casing, carrying the disks and shaft with it. The opposite wing is released from pressure as soon as it arrives at the exhaust-opening E, which it may pass in the same position, until it arrives at the end of the opening, where it is thrown back into its recess by the exhaust fluid between the piston and itself. On arriving at the opposite end of the piston it is thrown back into position by its centrifugal impulse, assisted by the cam C striking the horn $h$. The cam also serves to keep the valves from falling out of position when the pressure is cut off. The abutment P is fastened to the casing in a way to allow it to have lateral motion with the disks, which obviates the friction which would be exerted on it by lateral pressure toward the side of the shaft-opening if it were rigid. The valves are pivoted at a sufficient distance from the periphery of the inner disk to form a shoulder on it, against which the valves rest and form a tight joint by the pressure on them. The horns rest on a similar shoulder opposite.

It is obvious that any number of valves may be attached to the disks; but two will be sufficient to obtain continuous impulse. Packing may also be placed on all surfaces in contact.

A vacuum force applied at E will be as efficient to propel this engine as a pressure at I. When pressure and vacuum are applied together, the lateral pressure toward the shaft-opening will be balanced by the two forces, and obviate the friction on the shoulder of the shaft.

I do not claim a combination of pivoted valves, an abutment, and a cam. I am aware that this is not new.

My improvement consists in fastening to a rotating piston two disks of larger diameter, which are closely fitted to revolve freely in a casing, and in arranging an abutment between them, so that the whole will have lateral movement, and not cause any leakage thereby, and also in facilitating the hinging of the valves, which is done by the same bolts that fasten the disks together.

What I would claim as new is—

1. In a rotary engine, an abutment arranged between the disks of a rotating piston, and adapted to have lateral motion, as and for the purpose described.

2. The combination of a laterally-movable abutment, P, a rotating piston, D' D D, valves V, hinged to outer disks D D, a cam, C, and casing F $f$.

BERNARD FRESE.

Witnesses:
HENRY LAWRENCE,
CHARLES B. BRIGHAM.